United States Patent [19]

Yeager

[11] 4,234,256
[45] Nov. 18, 1980

[54] DETERMINING DEPTH LOCATION OF SEPARATIONS WITHIN A TIRE

[75] Inventor: Robert W. Yeager, Akron, Ohio

[73] Assignee: The Goodyear Tire & Rubber Company, Akron, Ohio

[21] Appl. No.: 892,546

[22] Filed: Apr. 3, 1978

[51] Int. Cl.³ .............................................. G01B 9/021
[52] U.S. Cl. .................................................. 356/348
[58] Field of Search ................................ 356/347, 348

[56] References Cited

U.S. PATENT DOCUMENTS

| | | | |
|---|---|---|---|
| 3,649,127 | 3/1972 | Kersch et al. | 356/347 |
| 3,860,346 | 1/1975 | Kersch etal. | 356/348 |
| 3,976,380 | 8/1976 | Rottenkolber et al. | 356/348 |

FOREIGN PATENT DOCUMENTS 2641516  3/1978  Fed. Rep. of Germany ........... 356/348

Primary Examiner—Edward S. Bauer
Assistant Examiner—Matthew W. Koren
Attorney, Agent, or Firm—T. P. Lewandowski

[57] ABSTRACT

A method for determining the depth of a separation employs laser interferograms filmed of the interior surface of a tire. The tire in a chamber is subjected to two different sub-atmospheric pressures which differ by a predetermined increment. The foregoing abstract is not to be taken as limiting the invention of this application, and in order to understand the full nature and extent of the technical disclosure of this application, reference must be made to the accompanying drawing and the following detailed description.

4 Claims, 3 Drawing Figures

DETERMINING DEPTH LOCATION OF SEPARATIONS WITHIN A TIRE

The present invention relates to non-destructive testing of tires and particularly to a method of examining tires to determine the depth location in the tire of separations therein when such separations exist.

The term "separations" employed in the present specification including the claims will be understood to mean those areas where the bond between adjacent plies or layers in the tire is absent or weak. Such separations can occur in the tire manufacturing process if air or other adhesion inhibiting foreign material becomes trapped between adjacent pairs of successively applied layers in the tire building process.

A small separation in a tire, although undesirable, may be completely harmless during the useful life of the tire. A similar size separation, however, if located in a critical part of the tire, may render the tire useless. The present invention provides a method for distinguishing harmless separations from separations which can affect the useful performance and life of the tire.

Separations also can develop during the useful life of a tire when it is subjected to abuse in service. In such cases, it is desirable that such separations be located, and particularly located as to the depth of the separation in the tire. When such a separation is located at a depth in the tire such that it can be exposed or removed during the normal preparation for retreading the tire, the useful life of the tire can be considerably extended by the retreading. If the separation is beyond the depth which permits exposure or removal during a retreading operation, retreading such tire is not desirable.

An important object of the present invention is to provide a method for determining the depth location of a separation or separations in a cured tire by which method the foregoing disadvantages can be overcome.

Broadly, the aforesaid object is achieved by subjecting a tire to be tested to a plurality of successive subatmospheric pressures, differing by predetermined increments, and forming on a photographic plate or film a double exposure or hologram of the inner surface of the tire, one exposure at each said pressure; and after developing said plate or film, illuminating said hologram by appropriate lighting, selecting patterns of interference lines displayed in the hologram which are indicative of the presence of a separation, and analyzing by measurement and/or comparison the patterns of interference lines displayed in the hologram to determine the depth of a separation within the tire outward from said inner surface.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
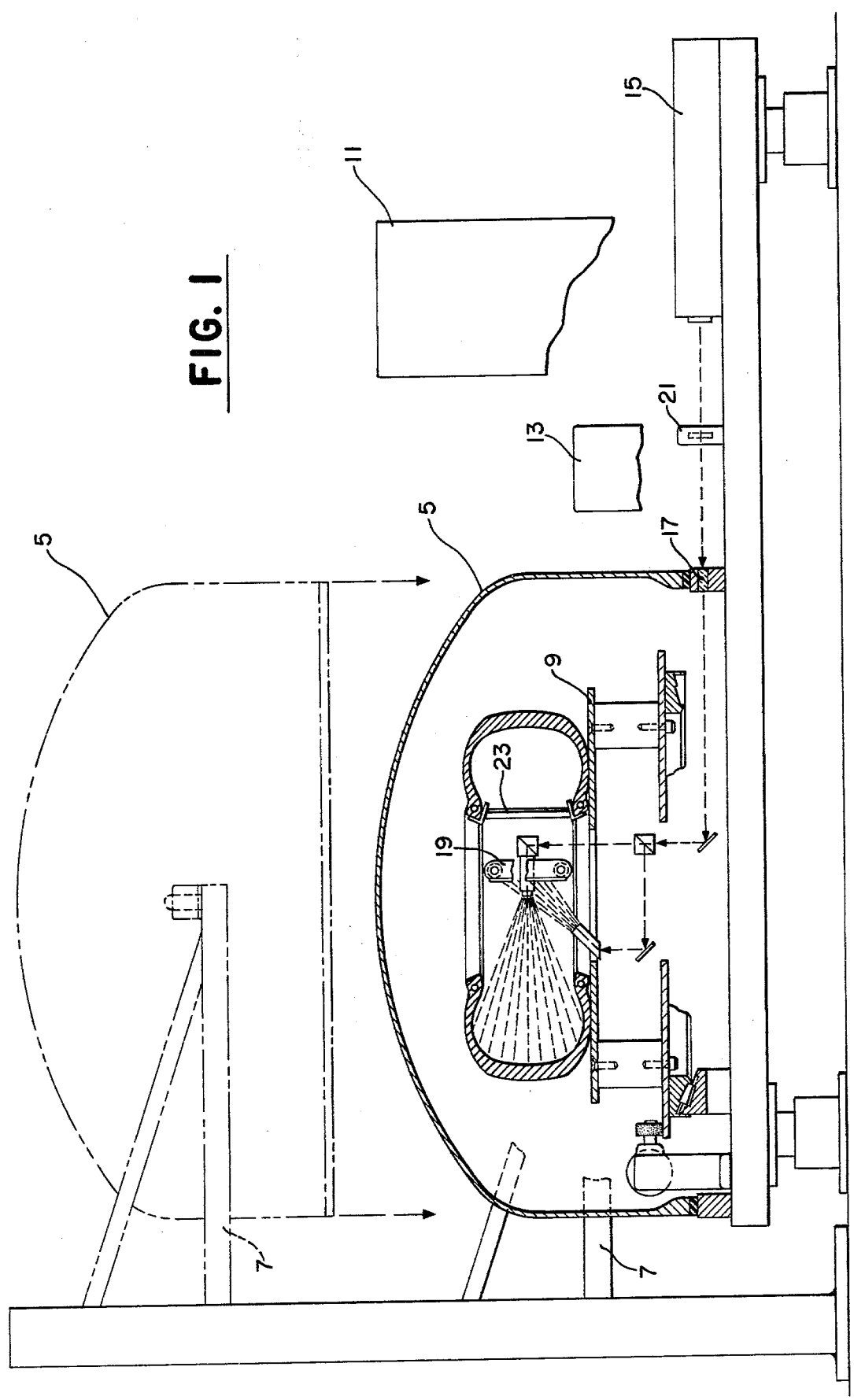
FIG. 1 is a schematic diagram of apparatus useful to carry out the method according to the invention.

The methods about to be described are best carried out in an apparatus schematically illustrated in FIG. 1. The apparatus includes, a dome 5, a dome lift assembly 7, a surface plate assembly 9, a suitable control console 11, and a vacuum system 13. The light source of the tire analyzer is a laser 15 which produces a beam of temporally and spatially coherent light. The beam, extending through a window 17, is split, one portion being directed by mirrors to illuminate directly the inner surface of a tire, the other portion illuminating the film or plate of the interferometer 19. Exposure is controlled by a conventional shutter 21 which controls the laser beam to the film holder of the interferometer which is mounted centrally of the tire cavity.

A tire to be inspected in accordance with the present method is prepared by spreading and holding the bead portions in the spread apart position. Any convenient means can be used, for example, three or four struts 23 of suitable length placed at arcuate intervals between the bead portions.

After being spread, the tire is allowed to rest for a time period sufficient to relax the stresses in the tire which arise from the spreading. Otherwise, a continued movement of portions of the tire in response to the unrelaxed stresses will affect the holograms to be produced to an extent making difficult the recognition and analysis of the interference patterns.

It is sometimes desirable to mark on the inner surface of the tire, for example, with a white ink, a grid or lattice of uniformly spaced lines. Such grid can serve to determine the area of a particular pattern indicative of a separation. Many tires, however, already have on the inner surface a pattern of ridges and grooves resulting from grooves or ridges on the airbag or bladder which is pressed into contact with the inner surface of the tire during molding and curing operations. Since the spacing of such lines can readily be determined, these lines can as well be used to determine quite accurately the areas of particular patterns indicative of separations. Either the pattern of ink marked lines or the pattern of lines existing on the inner surface are readily seen in the holographic images to be produced.

After the tire, in its spread condition, has rested sufficiently to relax the stresses therein, it is placed on the surface plate assembly 9 with its rotational axis vertical and its interior cavity at least approximately centered with respect to the interferometer 19.

With the tire in place on the surface plate assembly, the dome 5 is lowered to surround the tire and to form a chamber in which the pressure can be controlled. The dome is opaque to ambient light.

With the tire in position in the closed chamber, the pressure therewithin is controlled to a first pressure, preferably at or less than the exterior ambient pressure, the laser is energized to illumine a portion of the inner surface of the tire. A first exposure of the film or plate in the plate holder of the interferometer is made by opening the shutter for a predetermined time. The pressure within the chamber is then changed by a predetermined increment to a second and sub-atmospheric pressure level and the shutter is then actuated to cause a second exposure of the film or plate of the interferometer.

The surface plate assembly can be rotated to successive angular positions at each of which the steps described are repeated to produce a double exposure hologram in each selected angular position of the tire. The plate or film is then developed by appropriate photographic development procedures and reconstructed in a viewer (not shown) wherein the film or plate is illuminated by suitable light source.

It is well known that very small movements of the surface illuminated are reproduced in such an interferogram; i.e. a double-exposure hologram, in the form of interference patterns or lines. It is also known that the surface illuminated by a laser beam can be caused to move by the application of a force such as to cause a change in stress within the body of the article illumined. In the present method, the reduction of pressure within the chamber permits the tire to expand which expansion results in a movement of the inner surface of the tire and the production in the double exposure hologram of a plurality of interference lines or bands. In the absence of any separations in the tire, such interference bands are relatively regular both around the tire circumference and around the cross-section contour. On the other hand, the existence of a separation results in the production in the interferogram of a characteristic pattern indicative of the separation.

I have discovered that certain patterns of fringe interference lines not only show the presence of separations but have the advantage that they can be used to measure the depth location of a separation in the tire. As a specific example, by analysis of the fringe patterns, a separation existing between a carcass ply and an inner belt ply can be distinguished from a separation existing between a radially outermost belt ply and the next radially inward belt ply.

Commonly, a separation is indicated by an area, e.g., a "bull's eye" surrounded by a plurality of closed lines. The area thus defined by the interference lines can be measured by counting the lines of the grid or of the molded ridges in the inner surface.

Figure 2:
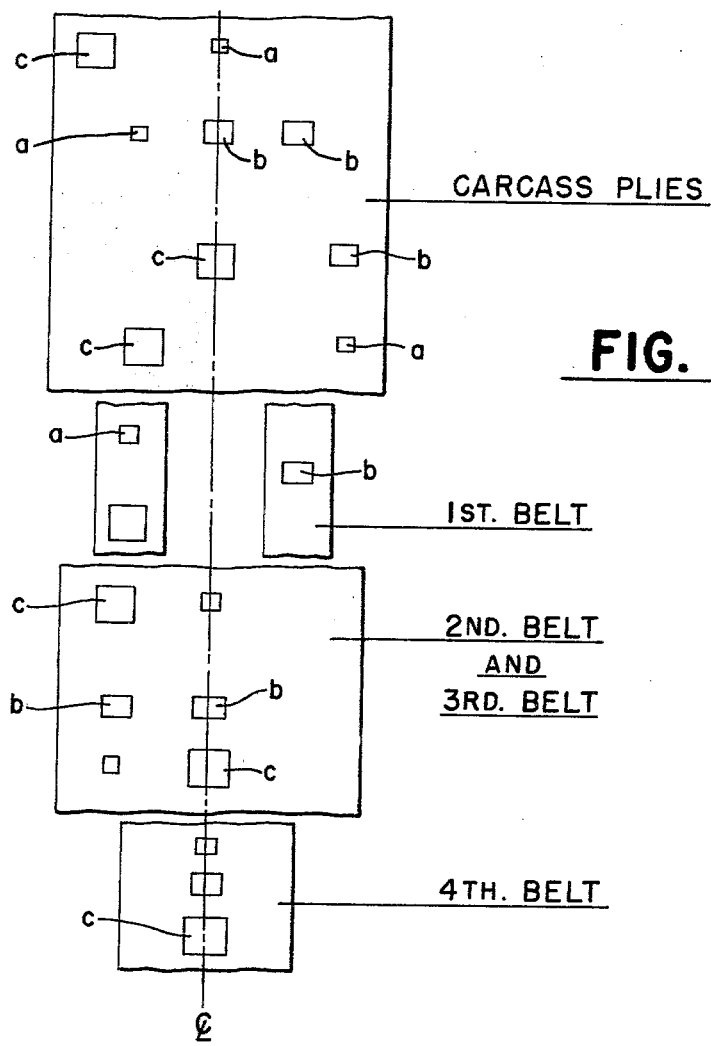
FIG. 2 is a schematic developed view of a reference tire prepared for use in the practice of the invention.

In carrying out one aspect of the method, a reference tire, dimensionally identical to the tire to be tested, is built by procedures identical to those used in manufacture of the tire to be tested, with the exception that between each pair of successively adjacent plies at least one separation is formed artifically by the insertion between the plies of a precut patch of a non-adherent film of Teflon ®, or the like, of known dimensions. FIG. 2 illustrates a representative construction for such a reference tire. In FIG. 2, the first ply has superposed thereon three $\frac{1}{4}''\times\frac{1}{4}''$ pieces of a Teflon$^{(Reg. \#)}$ film as indicated at a each located at a predetermined angle of rotation of the tire and each located at a predetermined distance from the circumferential centerline. In like manner, three $\frac{1}{2}''\times\frac{1}{2}''$ pieces are located as illustrated at b, and three additional pieces of film $1''\times1''$ are located as indicated by c. On the respective first, second, third, and fourth belts, film pieces are located in like manner such that each piece of film will cause, in an interferogram of the inner surface of the tire, a pattern indicative of the built-in separation known in area, location, and depth.

The reference tire constructed as described is then prepared and disposed in the apparatus of FIG. 1 and subjected to a plurality of sub-atmospheric pressures therein at each pair of which pressures in interferogram, i.e. a double-exposure hologram, is made which is then developed and maintained for comparison with holograms of tires to be tested.

The tire to be tested is then placed in the apparatus and successive interferograms made as previously described herein. Interferograms so made of the tire to be tested can then be compared with the interferograms made of the reference tire and a determination of the depth of a separation in the tire to be tested can be made by the visual similarity of the patterns of interference fringe lines.

To repeat, every separation indicated in the patterns displayed in the double-exposure hologram is characterized by a series of interference fringes around its periphery. The number of fringes and the density, that is, the number of fringe lines per unit of length measured perpendicularly with respect to the fringe lines, illustrates first of all that a separation exists. The determination of the depth location of the separation within the tire requires that the area of separation be less than a maximum size related directly to the tire flexibility and to the vacuum applied. For wire ply belted radial passenger tires, and for wire ply belted radial truck tires the maximum sizes are $\frac{3}{4}''$ and $2''$ in diameter, respectively.

The detection of a separation requires a vacuum, that is, a sub-atmospheric pressure, suited to each type of tire. A vacuum too low will fail to reveal separations which are deep in the tire from the inner surface. Too great a vacuum not only reduces the quality of the holograms and the ability to determine the depth of the separation but also requires greatly increased inspection time. For wire ply belt radial truck tires, vacuums of 2, 4, and 6 inches of mercury have been found satisfactory.

Figure 3:
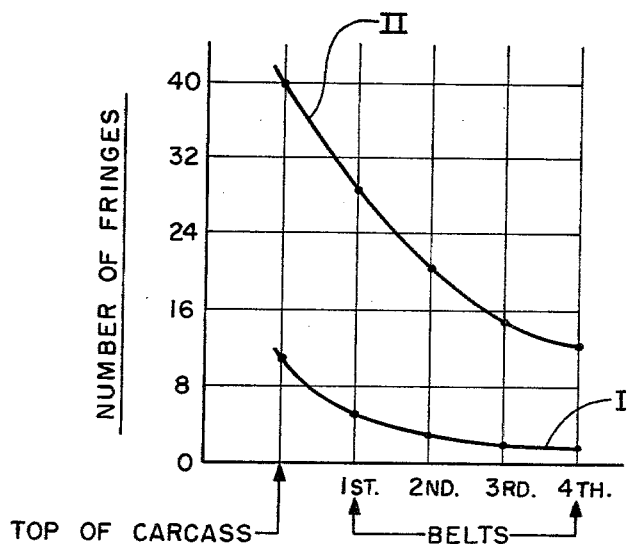
FIG. 3 is a chart of the number of fringe lines counted versus the depth of a separation in a tire.

In FIG. 3 is shown a plot of the number of fringe lines as the vertical axis and the depth in the tire with reference to the several plies therein as the horizontal axis. On the chart are shown a first curve I identifying a separation of $\frac{1}{2}''\times\frac{1}{2}''$ or $0.25^2$ inches and a second curve II representing a separation of known area of $1\frac{1}{4}''\times1\frac{1}{4}''$ or $1.56^2$ inches. After determining the area of a pattern in the holograms indicating a separation in the tire, and counting the number of interference fringes surrounding that area, the chart, FIG. 3, is entered at the number of fringe lines indicated, and read horizontally to the curve for the determined area. For example, in a pattern having an area of about 1.5 square inches surrounded by 16 lines, the depth of the separation will be determined to be at or close to the level of the third belt. A chart like that of FIG. 3 can be prepared from a double-exposure hologram made of a reference tire prepared as has been described hereinabove in connection with FIG. 2, taking care that the difference between the first and the second pressure, at least the latter being sub-atmospheric, is the predetermined increment. The plot of FIG. 3 was prepared by reference to double exposures made from the reference tire, a first exposure being taken at 2 inches of mercury vacuum, and a second at 6 inches of mercury vacuum.

It has been found also that a technician, after having analyzed a sufficient number of holograms made in the manner described, is able to recognize readily the depth location of the particular separation in the tire by viewing the count and character of the interference fringes surrounding the area indicative of the separation.

Dimensions stated herein in inches can be converted to centimeters by multiplying inches by 2.54 cm/inch.

While certain representative embodiments and details have been shown for the purpose of illustrating the invention, it will be apparent to those skilled in the art that various changes and modifications may be made therein without departing from the spirit or scope of the invention.

What is claimed is:

1. A method of determining the depth with respect to the inner surface of a tire of a separation in such tire comprising:

building a reference tire dimensionally identical to the tire to be tested and having built thereinto at least one separation of known area and depth in such tire, subjecting the reference tire to a plurality of pressures differing by predetermined increments of pressure at least one of said pressures being sub-atmospheric;

forming on photographic plate or film a holographic image comprising an exposure of said plate or film at two of said plurality of pressures;

illuminating said holographic images by appropriate lighting thereby to display at pattern of interference lines characteristic of the depth and area of said anomaly;

subjecting the tire to be tested to an identical plurality of pressures, forming a double-exposure hologram of the inner surface of said tire to be tested, one exposure at each of said pressures;

and comparing patterns of interference lines of the patterns displayed in the holographic image of said tire to be tested with the patterns of interference lines displayed in the holographic image of said reference tire, thereby to determine the depth of an anomaly in said tire to be tested.

2. The method of determining the depth location with reference to the inside surface of a tire, of a separation in such tire, comprising:

subjecting said tire to a plurality of discrete pressures differing by predetermined increments of pressure at least one of said pressures being sub-atmospheric;

producing holographic images of said inner surface in double-exposure of a photographic film or plate, one exposure being at each pressure of said plurality thereof;

illuminating said holographic images by appropriate lighting;

selecting patterns of interference lines which lines surround and define a measurable area of said inner surface;

measuring said area;

counting the number of lines surrounding said area so measured and determining said depth of the anomaly indicated by said area from the relation of said measured area and said number of lines counted.

3. Method of determining the depth of a separation in a tire which method comprises subjecting the tire to two discrete pressures differing by a predetermined increment of pressure, at least one of said pressures being sub-atmospheric, producing a double exposure holographic film of the surface of the tire making one exposure of the film at each of said two pressures, and determining from said film the depth of said separation in the tire with respect to the inner surface of the tire.

4. A method of determining the depth location of a separation in a cured tire with respect to the inner surface of the tire comprising subjecting said tire to a plurality of successive discrete pressures differing by predetermined increments at least one of said pressures being sub-atmospheric;

forming on photographic plate or film a hologram of the inner surface of the tire at each of said plurality of pressures;

illuminating said hologram by appropriate lighting;

selecting a pattern of interference lines displayed in said hologram indicative of the presence of such separation;

counting the number of interference lines per unit length normal to the direction of said lines of said pattern;

comparing the number of lines counted with a predetermined number of lines corresponding to the predetermined increment of pressure;

thereby determining the depth of said separations with respect to said inner surface of the tire.

* * * * *